Sept. 23, 1958 O. J. POUPITCH 2,853,112
LOCKED BOLT AND SHEAR RESISTING GROMMET MEANS
Filed April 27, 1954 2 Sheets-Sheet 2
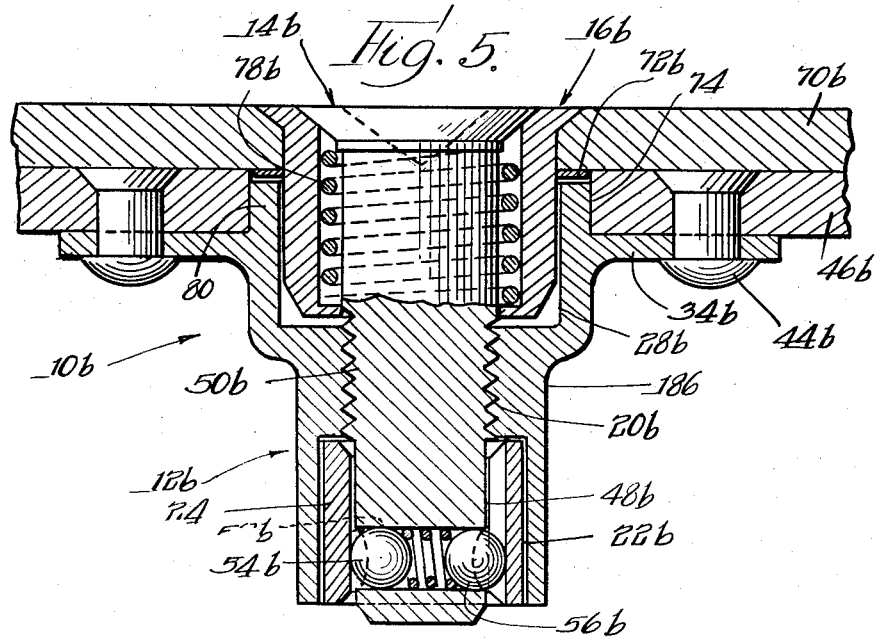
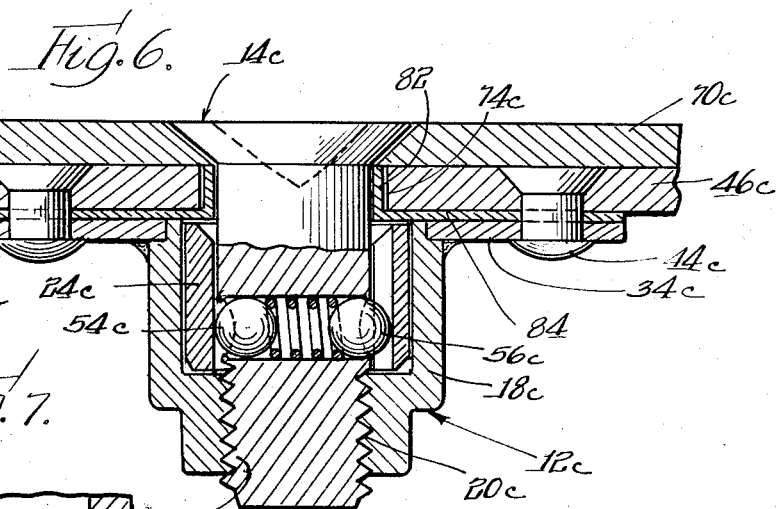
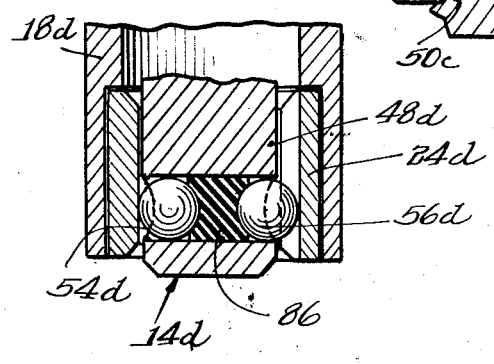
INVENTOR.
Ougljesa Jules Poupitch
BY
Olson & Trexler
attys United States Patent Office 2,853,112
Patented Sept. 23, 1958

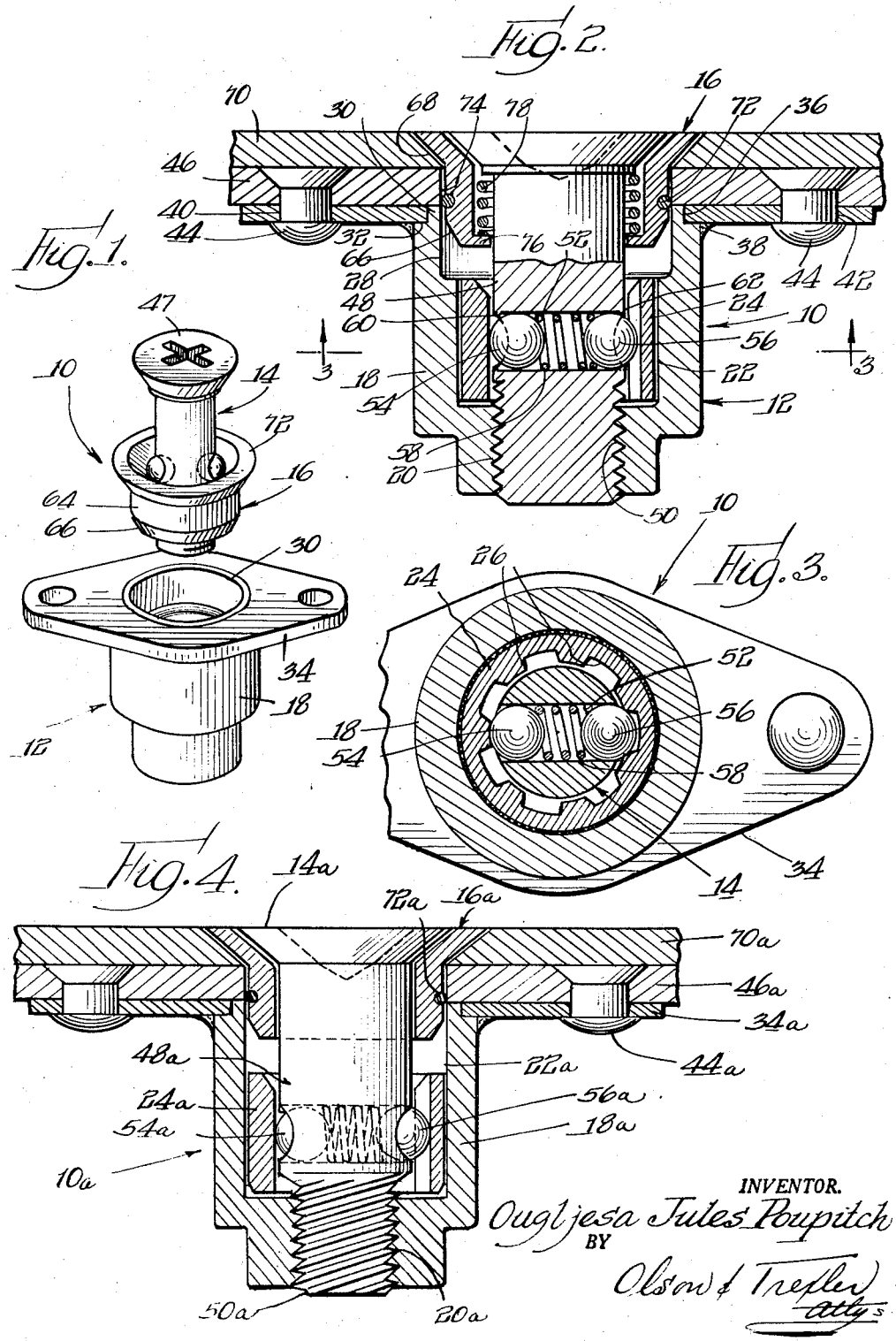

2,853,112

LOCKED BOLT AND SHEAR RESISTING GROMMET MEANS

Ougljesa Jules Poupitch, Itasca, Ill., assignor to Illinois Tool Works, Chicago, Ill., a corporation of Illinois Application April 27, 1954, Serial No. 425,914

2 Claims. (Cl. 151—9)

The present invention relates to novel fastener devices and more particularly to quickly operable fastener devices especially adapted releasably to secure a pair of panels or workpieces together, which workpieces may be, for example, cowling parts of aircraft.

As is well known certain aircraft cowling parts are frequently removed and replaced for aircraft maintenance purposes and such parts are often removed and replaced after each flight of the aircraft. Therefore, various quickly operable fastening devices have been suggested which devices include a nut-like member or receptacle fixed to the aircraft and a stud member adapted to extend through the removable cowling part. It has also been suggested that such stud members be provided with yieldable projection means for locking them in assembled relationship with the nut-like member. However, such heretofore suggested fastening devices have not been entirely satisfactory since they may score or otherwise injure the cowling parts during each application of the stud and since the locking projections have been located so that assembly of the cowling parts is unnecessarily difficult.

It is an important object of the present invention to provide a novel quickly operable fastener device of the above described general type which is constructed so as to prevent injury to the workpieces or cowling parts during assembly and disassembly of the fastener.

Another object of the present invention is to provide a novel quickly operable fastener which is more efficient in operation and which is relatively rugged and easy to manufacture.

Still another object of the present invention is to provide a novel quickly operable fastener of the above described type, which fastener includes a stud member having locking projection means located so as to permit the workpieces or cowling parts to be assembled together relatively easily.

A further object of the present invention is to provide a novel quickly operable fastening device of the above described type which is constructed so that shear strains applied thereto may be absorbed without injury to either the fastening device or the workpieces.

Other objects and advantages of the present invention will become apparent in the following description in the accompanying drawings wherein:

Fig. 1 is an exploded perspective view illustrating the elements of a quickly operable fastening device embodying the principles of this invention;

Fig. 2 is a cross sectional view showing the elements of the fastening device of Fig. 1 assembled together and also assembled with a pair of workpieces or cowling parts;

Fig. 3 is a cross sectional view taken along line 3—3 in Fig. 2;

Fig. 4 is a cross sectional view similar to Fig. 2 but showing a modified form of the present invention;

Fig. 5 is a cross sectional view similar to Fig. 2 but showing another modified form of the present invention;

Fig. 6 is a cross sectional view similar to Fig. 2 but showing still another modified form of the present invention; and Fig. 7 is a fragmentary cross sectional view showing a further slightly modified structure embodying the principles of the present invention.

Referring now more specifically to the drawings wherein like parts are designated by the same numerals throughout the various figures, a fastening device 10 embodying the principles of this invention is shown in Figs. 1, 2 and 3. In general, the fastening device 10 includes a nut-like member or receptacle 12 a stud member 14 and a sleeve or grommet 16 through which the stud member is adapted to extend.

The receptacle 12 includes a cylindrical body member 18 having an internally threaded bore 20 at its outer end for receiving a complementary threaded portion of the stud member described in more detail below. Above the threaded bore 20 the body member is provided with an enlarged counterbore 22 in which is mounted a sleeve member 24 having a plurality of axially extending grooves 26 formed in and spaced around its internal wall as shown best in Fig. 3. These grooves are adapted to cooperate with projection means on the stud to lock the stud against inadvertent retrograde rotation and, therefore, the sleeve 24 is mounted within the body member so as to prevent relative rotation therebetween. The sleeve may be fixed against rotation in any suitable manner such as by providing its outer surface with serrations adapted to dig into the wall of the counterbore 22. The body member 18 includes a second and further enlarged counterbore 28 into which the grommet 16 extends and an upstanding annular flange 30 extending axially from an upper end surface or shoulder 32.

In order to mount the body member 18 to a workpiece the nut-like member or receptacle is provided with a mounting plate 34. The mounting plate 34 includes a central portion having an aperture 36 of substantially the same diameter as the upstanding annular flange 30 so that the mounting plate may be assembled over the flange with a force fit. The mounting plate is then permanently secured to the body member preferably by means of a hydrogen braze indicated at 38. With this relatively simple and economical connection between the mounting plate and the body member the assembly has high resistance to breakage which otherwise might result from impact, shear or fibratory stresses to which the assembly may be subjected. Opposite ends of the mounting plate are respectively provided with apertures 40 and 42 through which rivets 44 or the like may be inserted for fastening the mounting plate to a workpiece or panel 46.

The stud member 14 includes an enlarged head 47 and an elongated shank having a smooth portion 48 and a threaded portion 50 which portions preferably have substantially the same outside diameter. The smooth portion of the shank is provided with a transversely extending bore 52 in which is disposed a pair of balls 54 and 56 which are resiliently urged outwardly by means of a spring 58. The opposite ends of the bore 52 are respectively deformed inwardly as indicated at 60 and 62 in order to prevent complete disassembly of the balls.

The grommet 16 includes a cylindrical portion 64 having an inwardly beveled end 66 to facilitate insertion of the grommet through an aperture 68 in a workpiece or cowling part 70. The upper end of the cylindrical portion 64 merges with an outwardly flared section 72 which is adapted to seat on the conical surface of the aperture 68 and which in turn provides a conical seat for the head of the stud.

When assembling the workpiece 70 to the panel 46 the grommet 16 is first passed through the opening 68 and is retained in assembled relationship with the workpiece 70 by means of an expandible resilient ring 72 which is located within a suitable annular groove formed in the cylindrical grommet portions 64. In the position shown in Fig. 2 the ring 72 is forced substantially entirely within the groove by the wall of the aperture 74 formed in the panel 46, which aperture preferably has substantially the same diameter as the smallest diameter of the aperture 68. As will be understood, the expandible ring 72 will spring partially out of the groove upon removal of the workpiece 70 and the grommet 16 from the panel 46 so that the ring will engage beneath the panel 70 and retain the grommet in assembled relationship therewith. The stud member 14 may be inserted through the grommet either before or after the grommet is applied to the workpiece 70 and thereafter the stud member is retained in assembled relationship with the grommet by the balls 54 and 56 which engage beneath the inner end of the grommet. The inner end of the grommet 16 is provided by an inturned flange 76 that has an internal diameter only slightly greater than the diameter of the stud member shank whereby the balls must be compressed within the shank in order to permit either assembly or disassembly of the stud member and the grommet. In addition, the inturned flange 76 provides a seat against which a compression spring 78 bears for resiliently urging the stud member outwardly until the balls engage the flange thereby facilitating disassembly of the stud member from the receptacle.

After the stud member and the grommet have been assembled together and have been assembled with the workpiece or cowl part 70 in the manner described above, the cowl part 70 is applied over the workpiece 46 and the grommet is inserted through the aperture 74. It should be noted that the balls 54 and 56 are located on the stud member shank so that when the parts are in the position illustrated in Fig. 2 the distance between the balls and the lower end of the grommet is greater than the axial length of the internally threaded bore 20 so that the cowl part 70 may be positioned flush against the workpiece 46 before the stud enters the threaded bore. With the part 70 flush against the part 46 the threaded stud end portion projects into the sleeve 24 and since the internal diameter of the sleeve is substantially equal to the maximum diameter of the threaded bore 20 the threaded stud portion is perfectly aligned for application to the threaded bore. This application is of course accomplished by an operator utilizing a tool such as a screw driver for pressing the stud member in against the action of the spring 78 and for turning the threaded end of the stud member into the threaded bore. Preferably the threads on the stud member and in the bore 20 are provided with a long lead so that the stud member may be competely threaded into the bore with a minimum of turning. As the stud member is turned into the threaded bore the balls 54 and 56 enter the sleeve 24 so that in the final adjusted position of the stud member at least one of the balls 56 interengages with one of the axially extending grooves 26 in the sleeve and locks the stud against inadvertent retrograde movement.

With the structure described above it is seen that regardless of the number of times the cowl part 70 is assembled with or removed from the workpiece 46 very little or no injury will be inflicted upon the marginal portions of the cowl part and workpiece surrounding their respective apertures since these marginal portions are never contacted by either the stud member or the retaining balls. Furthermore, it should be noted that the external diameter of the grommet is substantially equal to the diameters of the apertures 68 and 74 in the cowl part and workpiece and to the diameter of the counterbore 28 so that the grommet locks these parts against any tendency toward lateral relative movement and receives any shear stresses that might be created so as to prevent injury to the receptacle and stud member.

In Fig. 4 there is illustrated a slightly modified form of the present invention which is substantially similar to the above described embodiment as indicated by the application of indentical numerals with the suffix $a$ added to corresponding elements. The embodiment of Fig. 4 differs essentially in that the ejecting spring 78 of the above described embodiment has been omitted along with the spring confining flange 76 of the grommet. This modification enables the grommet to be more economically produced and also enables the receptacle to be formed more economically since the above described second counterbore 28 may also be eliminated. In addition, this embodiment shows how the diameters of the threaded bore 20$a$ and the threaded shank portion 50$a$ may be reduced. It is understood that the corresponding bore and shank portion of the embodiments shown in Figs. 2 and 6 may also be provided with reduced diameters and this may be done without substantially changing the resistance of the devices to shear stresses since the threaded portions of the shanks are primarily under tension. Furthermore, it is understood that the threaded shank portion 50$a$ may be formed with an outside diameter substantially equal to the diameter of the shank portion 48$a$, if desired, and that the diameter of the bore 20$a$ may also be enlarged.

Fig. 5 discloses another embodiment of the present invention which is essentially similar to the embodiment of Figs. 1 through 3 as indicated by the application of identical reference numerals with the suffix $b$ added to corresponding elements. This embodiment differs in that the body member 18$b$ is provided with an integral attachment or mounting plate 34$b$ rather than a separate mounting plate. While such an integral mounting plate may be desirable for certain installations having high strength requirements the structure of the first described embodiment is preferred since the receptacle with the separate mounting plate may be more easily and economically fabricated. Another difference in the body member 18$b$ is that it is provided with an upstanding integral flange 80 which extends within an enlarged opening 74$b$ in the workpiece 46$b$ in order to absorb shear stresses and relieve the rivets of such stresses.

An important feature of the embodiment illustrated in Fig. 5 resides in the fact that the smooth shank portion 48$b$ is located toward the end of the shank while the threaded shank portion 50$b$ is located in an intermediate position. In addition, the locking balls 54$b$ and 56$b$ are disposed within a transverse bore 52$b$ located substantially at the end of the shank. Of course, the threaded bore 20$b$ of the body member is also located at an intermediate position while the counterbore 22$b$ and the sleeve 24$b$ are located at the end of the body member. With this arrangement the screw member may be substantially completely withdrawn outwardly through the grommet before the balls engage the end of the grommet whereby the cowl part 70$b$ and the grommet 16$b$ may be initially assembled with the workpiece 46$b$ and the body member 18$b$ with a minimum of interference from the stud member. It should be noted that the smooth shank portion and the sleeve 24$b$ and further slightly modified in that their diameters are substantially equal to the minimum diameter of the threaded shank section in order to permit assembly of the smooth shank section through the threaded bore 20$b$.

In accordance with the present invention the particular arrangement of the screw threads and locking elements on the stud member and body member of the embodiment shown in Fig. 5 may also be incorporated in the structure shown in Figs. 1 through 4 and 6.

Another distinction of the embodiment shown in Fig. 5 over the embodiments described above is that the retaining ring 72$b$ is in the form of a flat annular sheet metal washer which is applied to the grommet with a force fit. Of course, the grommet should first be inserted through the aperture in the workpiece or cowl part 70$b$ whereupon the retaining ring is applied to provide a secure and permanent assembly.

Fig. 6 illustrates still another modified form of the present invention which is similar to the first described embodiment as indicated by the application of identical reference numerals with the suffix c added to corresponding elements. This embodiment differs from those described above in that the grommet has been replaced by a sheet metal wear plate having a centrally located cylindrical section 82 extending into the aperture 74c of the workpiece 46c and a large radially extending flange section 84 which is preferably substantially coextensive with the mounting plate 34c. With this structure the workpiece 46c is protected against injury which might be caused by repeated applications of the stud member therethrough. In addition the sheet metal plate member absorbs a considerable portion of any shear stresses that might otherwise be applied to the receptacle or nut member.

Fig. 7 illustrates a modified feature of this invention which may be incorporated in any of the structures described above as will be understood. In this embodiment the locking balls 54d and 56d are resiliently urged apart by means of a rubber block 86 disposed therebetween. The block 86 may be formed from any suitable high strength temperature resistant rubber, such as silicone rubber, and increases the useful life of the stud member since the rubber block is less likely to fail than the above described compression spring provided for the same purpose.

From the above description it is seen that the present invention has provided a novel quickly operable fastening device whereby workpieces such as cowl parts may be easily and repeatedly assembled and disassembled without injury thereto. In addition, it is seen that the present invention has provided a novel fastening device which is of relatively economical and rugged construction and which is formed so that both the workpieces and the fastening device are protected against injury which might result from the application of shear stresses.

While the preferred embodiments of the present invention have been shown and described herein it is obvious that many structural details may be changed without departing from the spirit and scope of the appended claims.

The invention is claimed as follows:

1. A fastening device for detachably securing together inner and outer work panels having registering apertures of substantially the same diameter, and comprising a headed stud member having an elongated shank adapted for insertion through the apertures of the work panels, a counterbored receptacle adapted for attachment to one of the work panels and having an internally threaded section coaxial with the counterbore, the stud shank having a threaded section complemental to the threaded section of the counterbore for threadedly engaging the same, said stud shank also having an unthreaded section between the head and the threaded section thereof, peripherally disposed rotation resisting means carried by the unthreaded section of the stud shank and resiliently urged radially outwardly, a sleeve member mounted within the counterbore of the receptacle and having internal peripherally disposed means for interfitting with the rotation resisting means on the stud shank and said means being mutually configured to resist unintentional rotation of the stud in the receptacle while permitting forced rotation of the stud in either direction for assembly and disassembly, grommet means having a cylindrical portion encircling the unthreaded portion of the stud shank adjacent the head thereof and adapted to extend into the counterbored portion of the receptacle to traverse the assembled work panels whereby to resist sheer stresses transmitted by the panels in the vicinity of the aligned apertures therethrough, said grommet means including an outward flange adjacent the stud head to overlie the adjacent outer work panel and a peripheral groove positioned in the cylindrical portion thereof to lie within the outer face of the inner work panel in assembled position, and peripherally disposed expansible and contractible spring means carried by the said peripheral groove in expanded and contracted positions and presenting an outer cam-like surface to facilitate assembly with the work panels, the aperture in the inner work panel and the inner surface of the counterbore presenting surfaces facing said spring means with at least one of said surfaces maintaining the spring means in contracted position and operating to wedge the grommet means in assembled position with the work panels and serving in expanded position to overlie the adjacent surface of the outer work panel and trap the fastening device thereon during assembly, the inner end of the cylindrical portion of said grommet means and the adjacent end of said sleeve member being axially separated to provide a space into which the rotation resisting means are outwardly urged during assembly with the head of the stud projecting outwardly from the grommet means in position such that the leading threads of the threaded section of the shank are axially spaced from said rotation resisting means a distance such that as the threaded section of the shank is turned into the threaded section of the counterbore the rotation resisting means will enter said sleeve member.

2. A fastening device as claimed in claim 1, wherein there is provided a compression spring encircling the stud shank between the stud head and inward flange means on the grommet means to urge the stud member outwardly whereby to facilitate disassembly thereof from the receptacle.

References Cited in the file of this patent

UNITED STATES PATENTS

| | | |
|---|---|---|
| 1,434,558 | Merryman | Nov. 7, 1922 |
| 2,167,285 | Smith | July 25, 1939 |
| 2,338,333 | Jenkins | Jan. 4, 1944 |
| 2,372,772 | Ellis et al. | Apr. 3, 1945 |
| 2,433,138 | Marcell | Dec. 23, 1947 |
| 2,479,992 | Woods | Aug. 23, 1949 |
| 2,533,115 | Huelster | Dec. 5, 1950 |
| 2,640,244 | Becker | June 2, 1953 |
| 2,662,260 | Marschner | Dec. 15, 1953 |
| 2,758,625 | Poupitch | Aug. 14, 1956 |